(12) United States Patent
Kim et al.

(10) Patent No.: US 7,171,118 B2
(45) Date of Patent: Jan. 30, 2007

(54) OPTICAL CROSS-CONNECT USED IN AN OPTICAL NETWORK AND METHOD PERFORMED BY THE SAME

(75) Inventors: Sang-Ho Kim, Seoul (KR); Yun-Je Oh, Yongin-shi (KR); Jun-Ho Koh, Suwon-shi (KR); Byung-Jik Kim, Songnam-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 652 days.

(21) Appl. No.: 10/410,561

(22) Filed: Apr. 9, 2003

(65) Prior Publication Data
US 2003/0194236 A1 Oct. 16, 2003

(30) Foreign Application Priority Data
Apr. 10, 2002 (KR) ................ 2002-19578

(51) Int. Cl.
H04J 14/00 (2006.01)
H04B 10/08 (2006.01)

(52) U.S. Cl. ............... 398/50; 398/12; 398/19; 398/45; 398/56

(58) Field of Classification Search ............ 398/45, 398/50, 56, 12, 19
See application file for complete search history.

(56) References Cited

U.S. PATENT DOCUMENTS 6,944,405 B1 * 9/2005 Lee et al. ............. 398/154

2002/0114031 A1 * 8/2002 Yamada ............. 359/119

FOREIGN PATENT DOCUMENTS

| EP | 1 200222 | 11/2000 |
|---|---|---|
| JP | 06-188940 | 7/1994 |
| JP | 07-307739 | 11/1995 |
| JP | 11-313033 | 11/1999 |
| JP | 2000-183824 | 6/2000 |
| JP | 2001-244906 | * 9/2001 |
| JP | 2002-051390 | 2/2002 |
| WO | WO 00/42811 | 7/2000 |
| WO | WO 00/67408 | 11/2000 |

* cited by examiner

Primary Examiner—M. R. Sedighian
(74) Attorney, Agent, or Firm—Cha & Reiter, LLC.

(57) ABSTRACT

Disclosed are an apparatus and a method for shortening a processing time at each node in an optical network. A transmission optical cross-connect (OXC) determines a transmission rate corresponding to the transmission speed of the signal to be transmitted. An optical receiver and an optical transmitter are stabilized by means of the transmission rate. In addition, a transmission OXC transmits the transmission rate to an OXC aligned between the transmission OXC and the receiving OXC, thereby stabilizing the OXC. Each of the OXCs detects the transmission speed of the optical signal to be received so that a time required for converting the transmission speed is reduced.

6 Claims, 6 Drawing Sheets

OPTICAL CROSS-CONNECT USED IN AN OPTICAL NETWORK AND METHOD PERFORMED BY THE SAME

CLAIM OF PRIORITY

This application claims priority to an application entitled "Optical Cross-Connect Used In An Optical Network and Method Performed By The Same," filed in the Korean Industrial Property Office on Apr. 10, 2002 and assigned Ser. No. 2002-19578, the contents of which are hereby incorporated by reference.

BACKGROUND OF THE INVENTION

1. Field of the Invention

The present invention relates to an apparatus and a method for shortening a communication time between nodes in an optical network, and more particularly to an apparatus and a method for shortening a processing time at each node.

2. Description of the Related Art

Recently, demand for the very high speed Internet service and various multimedia services has increased dramatically. In order to efficiently cope with the increasing demand, it is necessary to provide a broadband communication network adapted to new services providing easy transmission of visual and image information as well as voice and data. For integrating and unifying the various services, a broadband integrated services digital network (B-ISDN) is provided. In addition, in order to easily transmit voice, data, and image information, a high frequency band is required, such as a millimeter wave band, while taking into consideration transmission capacity and radio range. To meet these requirements, an optical network is typically suggested. In the optical network, nodes are connected to each other through an optical cable, so that an optical signal is transmitted between the nodes.

Various transmission techniques are used in the optical network. An example of these transmission techniques is wavelength division multiplexing (hereinafter, referred to WDM). According to WDM, a low loss wavelength band of an optical fiber is divided into a plurality of narrow channel wavelength bands, and a channel wavelength band is assigned to each input channel, thereby simultaneously transmitting input channel signals through the assigned wavelength bands. Accordingly, in the WDM, channel wavelength bands are independent of one another regardless of transmission data format, so an analog signal and a digital signal can be simultaneously transmitted. In addition, it is possible to transmit signals having transmission rates that differ from each other. Since the WDM has superior extensibility and permeability, the WDM may be widely used in the future.

On the other hand, an apparatus called "optical cross-connect" (hereinafter, referred to OXC) is required in the optical network using the WDM for switching optical signals to a plurality of subscribers. The OXC cross-connects the optical signals upon receiving the request of an operator or for fault recovery. In addition, the OXC inspects information regarding a channel's state and quality of the optical signal by receiving an inspection control signal, and transmits information to other nodes. In particular, the inspection and the cross-connection functions of the OXC should be performed at a high speed for rapidly recovering from a fault. Further, the OXC is required to have a low input loss, a low optical interference, and a low price.

The OXC are divided into electro-optic OXC and opaque OXC depending on transparency thereof. The opaque OXC is superior to the electro-optic OXC in view of the price and a wavelength variation. However, the opaque OXC is not transparent, so an optical transmitter and an optical receiver, which automatically detect a transmission speed of a transmission signal so as to convert the transmission signal, are used in the opaque OXC.

FIG. 1 is a schematic view illustrating a line switch caused by a fault in a predetermined section of an optical network using a conventional opaque OXC. In FIG. 1, a node B 100 is a transmission side, a node C 101 is a receiving side, and the fault occurs at a route 102 between the node B 100 and the node C 101. Nodes shown in FIG. 2 stand for the opaque OXC. In the description that follows a process for automatically converting the transmission signal by using the optical transmitter or the optical receiver is called "stabilizing process".

Referring to FIG. 1, each node transmits and receives a signal by using a predetermined wavelength formed between adjacent nodes. For example, the node B 100 transmits the signal to the node C 101 by using a wavelength ($\lambda_{31}$), and receives the signal from the node C 101 by using a wavelength ($\lambda_{21}$). In addition, the node B 100 transmits the signal to a node D 103 by using the wavelength ($\lambda_{21}$), and receives the signal from the node D 103 by using the wavelength ($\lambda_{21}$). At this time, since a transmission route is separated from a receiving route, there is no interference between the nodes even if the same wavelength is used. Accordingly, in a normal state, a transmission signal to be transmitted into the node C 101 is inputted in the node B 100, and the node B 100 transmits the transmission signal to the node C 101 by demodulating the transmission signal through the WDM by using the wavelength ($\lambda_{31}$). Then, the node C 101 demodulates the signal and outputs a demodulated signal as a receiving signal. At the time, the transmission signal is inputted into one of channel cards forming the node B 100, and the receiving signal is outputted through one of channel cards forming the node C 101.

However, when a line switch is required due to a fault between the node B 100 and the node C 101, the node B 100 sets a new route by means of a predetermined routing table. As shown in FIG. 1, the new route 104 is connected to the node C 101 through a node D 103. At this time a new wavelength ($\lambda_{32}$) is created between the node B 100 and the node D 103, and another new wavelength ($\lambda_{33}$) is created between the node D 103 and the node C 101. The new wavelengths are selected so as not to create interference with existing wavelengths.

FIG. 2 is a flow diagram illustrating a signal processing flow in the normal state of the node B 100 and node C 101 illustrated in FIG. 1.

Referring to FIG. 2, the transmission signal 200 is inputted into a predetermined optical receiver provided in the node B 100. The predetermined optical receiver measures the transmission speed of the inputted transmission signal through an automatic transmission speed converting function and performs the stabilizing process with respect to the measured transmission speed. The stabilizing process prepares the environment required to process the signal based on the measured transmission speed. In FIG. 2, a time required for the optical receiver to perform the stabilizing process 201 is defined as "turnaround time A". On the other hand, when the stabilizing process is finished, the optical transmitter converts the inputted transmission signal into an electric signal and transmits the electric signal to a switch 202. The switch transfers the electric signal to a predetermined optical transmitter according to the control of a main control unit (hereinafter, referred to MCU 203), which controls the whole operation of the node B 100. The switching 202 action of the electric signal is carried out at a high speed controlled by the MCU 203, so a time required for switching the electric signal is not illustrated in FIG. 2. The predetermined optical transmitter measures the transmission speed of the electric signal provided through the switching action, and performs the stabilizing process 204 with respect to the measured transmission speed. The stabilizing process prepares the environment required to process the signal based on the measured transmission speed. In FIG. 2, a time required for the optical transmitter to perform the stabilizing process is defined as "turnaround time B" 204. On the other hand, when the stabilizing process has finished, the optical transmitter converts the electric signal into the optical signal and transmits the optical signal to the node C 101. Accordingly, the total time spent at the node B 100 to transmit the optical signal to the node C after receiving the transmission signal is defined as "turnaround time A+turnaround time B".

On the other hand, the optical signal transmitted from the node B 100 is received in a predetermined optical receiver of the node C 101. In FIG. 2, a time required for transmitting the optical signal from the node B 100 to the node C 101 is defined as "turnaround time C" 205. The node C 101 processes the optical signal in the same manner as the node B 100. Accordingly, the total time spent at the node C to process the optical signal and output the optical signal as the receiving signal 206 is identical to the total time spent at the node B 100. That is, the total time spent at the node C 101 is defined as "turnaround time A+turnaround time B".

Therefore, in a normal state, the total turnaround time for transmitting the transmission signal from the node B 100 to the node C101, that is, the total stabilizing time required for normally transmitting the signal is defined as "2(A+B)+C".

FIG. 3 is a flow diagram illustrating a signal processing flow when the line switching is required due to the fault between the node B 100 and the node C 101 shown in FIG. 1.

Referring to FIG. 3, when the fault occurs in a route of the node C 101, the node B 100 performs a detour route switching. As a detour route, a route 104 connected to the node C 101 via the node D 103 is used. Accordingly, the predetermined optical receiver provided in the node B 100 measures the transmission speed of the inputted transmission signal through an automatic transmission speed converting function and performs the stabilizing process with respect to the measured transmission speed. In FIG. 3, a time required for the optical receiver to perform the stabilizing process is defined as "turnaround time A" 300. On the other hand, when the stabilizing process finished, the optical transmitter converts the inputted transmission signal into an electric signal and transmits the electric signal to a switch 301. The electric signal switched by the switch is inputted into the optical transmitter corresponding to the node D 103 having a new route to be switched. At this time, the switching action of the switch is carried out under the control of the MCU 302. The optical transmitter measures the transmission speed of the electric signal provided through the switching 301 action and performs the stabilizing process with respect to the measured transmission speed. At this time, a new wavelength ($\lambda_{22}$) for transmitting the signal to the node D 103 is determined through the stabilizing process. In FIG. 3, a time required for the optical transmitter to perform the stabilizing process is defined as "turnaround time B" 303. When the stabilizing process has finished, the optical transmitter converts the electric signal into the optical signal by using the wavelength ($\lambda_{22}$) and transmits the optical signal to the node D 103.

The optical signal transmitted from the node B 100 is received in a predetermined optical receiver of the node D 103. At this time, although it is not explained, the line switching caused by the fault has already been sent to the node D 103 from the node B 100. Accordingly, the node D 103 decides, based on the predetermined routing table, to transmit the optical signal received from the node B 100 to the node C 101. At this time, the wavelength ($\lambda_{33}$) for transmitting the signal to the node C 101 is determined. Then, the optical signal transmitted from the node B 100 is introduced into the predetermined optical receiver of the node D 103, and the optical receiver converts the optical signal into the electric signal through the stabilizing process. A time required for the stabilizing process is defined as "turnaround time A" 305. The converted electric signal is inputted into the switch 306 and switched to the predetermined optical transmitter by the switch 306 which 20 is controlled by the MCU 307 of the node D 103. The optical transmitter to be switched matches with the node C 101 corresponding to a final transmission terminal. The optical transmitter converts the electric signal into the optical signal through the stabilizing process and transmits the optical signal to the node B. At this time, a time required for the optical transmitter to perform the stabilizing process is defined as "turnaround time B" 308. In order to transmit the optical signal to the node C 101, the wavelength ($\lambda_{33}$) is used.

The optical signal transmitted from the node D 103 is received in the node C 101. The node C 101 converts the optical signal into the electric signal through the stabilizing process 309 and transmits the electric signal to the switch 310. In order to perform the stabilizing process in the optical receiver, "turnaround time A" is needed, as required in other optical receivers for performing the stabilizing process. The electric signal converted by the optical receiver is transmitted into the optical transmitter through the switching 309 action by means of the switch which is controlled by the MCU 311 of the node C 101. The optical transmitter converts the electric signal into the optical signal through the predetermined stabilizing process 312 and outputs the optical signal as a receiving signal 313. At this time, in order to perform the stabilizing process in the optical transmitter, "turnaround time B" is needed, as required in other optical transmitters for performing the stabilizing process.

On the other hand, in FIG. 3, a time required for transmitting the optical signal from the node B 100 to the node D 103, and a time required for transmitting the optical signal from the node D 103 to the node C 101 are both defined as "turnaround time C".

Accordingly, when the line switching occurs because of the fault, the total time for transmitting the transmission signal from the node B 100 to the node C 101, that is, the total stabilizing time, is defined as "3(A+B)+2C".

As discussed above, the optical transmitter and the optical receiver used in the conventional opaque OXC automatically detect the transmission speed of the inputted signal in order to convert the transmission signal. For this reason, the conventional opaque OXC causes a time delay because an automatic transmission speed conversion is carried out in the optical transmitter and the optical receiver. In particular, when the line switching is required as a result of the fault in the line, the fault recovery time is increased due to the time delay. As the number of the nodes is increased, the transmission time required for transmitting the signal from a transmission side to a receiving side will be further delayed. Accordingly, there is a need for reducing time delays.

SUMMARY OF THE INVENTION

The present invention provides an apparatus and a method for shortening a time delay caused by an automatic transmission speed conversion in an opaque OXC.

In addition, the present invention provides an apparatus and a method for shortening a recovery time caused by a line switching in an opaque OXC.

Further still, the present invention provides an apparatus and a method for shortening a time required for automatically converting a transmission speed of a signal in each OXC by transmitting information regarding an automatic transmission speed conversion from a transmission OXC to other OXCs forming an optical network.

According to a first aspect of the present invention, a stabilizing method is provided for a signal transmission from a transmission OXC to a receiving OXC in an optical network, in which a plurality of OXCs having a plurality of optical receivers and optical transmitters are connected to each other through optical lines, the method comprising the steps of:

determining a transmission rate corresponding to a transmission speed of an inputted signal;

stabilizing a predetermined optical receiver which converts the inputted signal into an electric signal; and a predetermined optical transmitter which converting the electric signal into an optical signal by means of the determined transmission rate.

According to a second aspect of the present invention, an optical network is provided for transmitting a signal from a transmission section to a receiving section, having a plurality of OXCs that are connected to each other through optical lines, the optical network comprising:

a transmission OXC that transmits a transmission rate to adjacent OXCs by determining the transmission rate corresponding to a transmission speed of an inputted optical signal, performs a stabilizing process for converting the inputted optical signal into an electric signal, and converts the electric signal into the optical signal by means of the determined transmission rate;

a receiving OXC that receives the transmission rate transmitted from the transmission OXC, performs the stabilizing process corresponding to the inputted optical signal and an outputted optical signal by means of the received transmission rate; and a relay OXC aligned at a route through which the signal is transmitted to the receiving OXC from the transmission OXC.

According to a third aspect of the present invention, a method is provided for performing a line switching when a fault occurs in a line while transmitting a signal from a transmission OXC to a receiving OXC through the line in an optical network, in which a plurality of OXCs having a plurality of optical receivers and optical transmitters are connected to each other through optical lines, the method comprising the steps of;

transmitting a transmission rate to adjacent OXCs through the use of the transmission OXC, while determining the transmission rate corresponding to a transmission speed of an inputted signal;

when the line switching is required caused by the fault, transmitting a switching signal to adjacent OXCs by the transmission OXC; and in response to the switching signal caused by the line switching, performing a stabilizing process for a predetermined optical receiver and a predetermined optical transmitter by means of the transmission rate using at least one OXC and the transmission OXC which are aligned in a route corresponding to a new line.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

According to the present invention, a transmission rate corresponding to a transmission speed of a transmission signal transmitted from a transmission OXC is determined and then this transmission rate is transmitted to adjacent OXCs. Accordingly, the transmission rate is sent to all OXCs forming an optical network. In addition, the OXCs arranged in a route, which is provided to transmit the transmission signal to the transmission OXC, simultaneously perform a stabilizing process based on an automatic transmission speed conversion by using the transmission rate.

Figure 6:
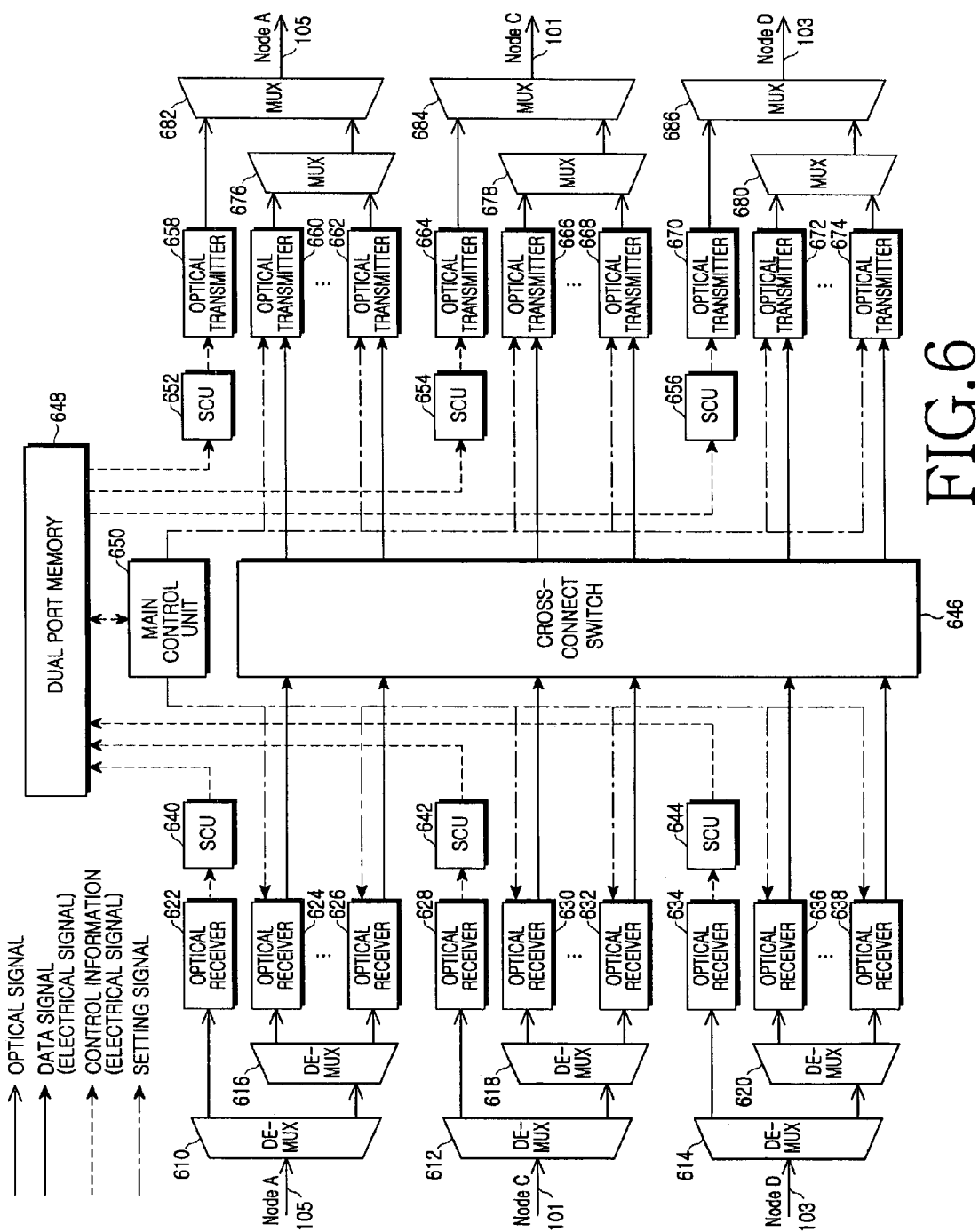
FIG. 6 illustrates a processing flow diagram of an abnormal state, for an optical network according to one embodiment of the present invention.

A structure of an OXC, according to one embodiment of the present invention, is shown in FIG. 6. The OXC shown in FIG. 6 matches with nodes forming an optical network. In addition, the structure of the OXC shown in FIG. 6 stands for relay nodes aligned in optical signal transmitting routes. An optical receiver (not shown) should be added to transmission nodes, and an optical transmitter (not shown) should be added to the receiving nodes. That is, the optical receiver is provided in the transmission nodes in order to receive the optical signal from an exterior without receiving the optical signal from an adjacent node, and the optical transmitter is provided in the receiving nodes in order to transmit the optical signal to the exterior without transmitting the optical signal to the adjacent node.

Referring to FIG. 6, de-multiplexers (DE-MUXs) 610, 612 and 614 receiving the optical signal from adjacent nodes divide the optical signal into a control optical signal and a data optical signal. The control optical signal includes a switching signal notifying a line switching caused by a fault, and transmission rate information required for automatically converting the transmission speed. On the assumption that FIG. 6 is a structure of a node B 100, the optical signal is inputted into the DE-MUXs 610, 612 and 614 from nodes A 105, C 101 and D 103, respectively. The control optical signal divided by the DE-MUXs 610, 612 and 614 is supplied into corresponding optical receivers 622, 628 and 634. The data optical signal divided by the DE-MUXs 610, 612 and 614 is supplied into DE-MUXs 616, 618 and 620. The DE-MUX 616 receives the data optical signal divided by DE-MUX 610 and distributes the data optical signal into a plurality of optical receivers 624 and 626. The DE-MUX 618 receives the data optical signal divided by DE-MUX 612 and distributes the data optical signal into a plurality of optical receivers 630 and 632. The DE-MUX 620 receives the data optical signal divided by DE-MUX 614 and distributes the data optical signal into a plurality of optical receivers 636 and 638. The optical receivers 622 628 and 634 receiving the control optical signal convert the inputted control optical signal into an electric signal and transmit converted control information (electric signal) to supervisor channel units (hereinafter, referred to SCUs) 640, 642 and 644. Each of SCUs 640, 642 and 644 records control information (electric signal) in a dual port memory 648. The optical receivers 624, 626, 630, 632, 636 and 638 receiving the data optical signal convert the inputted data optical signal into the electric signal and input the converted data signal (electric signal) into a cross-connect switch 646. At this time, each of optical receivers 624, 626, 630, 632, 636 and 638 performs a procedure for automatically converting the transmission speed of the data optical signal. The automatic transmission speed conversion is carried out based on a setting signal provided from a main control unit 650, which is different from the conventional manner where the stabilizing process is carried out based on the transmission speed after measuring the transmission speed of the optical signal.

The main control unit 650 outputs the setting signal having information required for automatically converting the transmission speed of the optical signal to be transmitted/received. Transmission rate information is used as information for automatically converting the transmission speed. If the node is a relay node or a receiving node, the transmission rate is provided from an adjacent node. If the node is a transmission node, the transmission rate is determined by the main control unit to match with the transmission speed of the signal to be transmitted. The transmission rate provided from the adjacent node can be checked through control information, which is recorded in the dual port memory 648 by means of the SCUs 640, 642 and 644. The main control unit 650 stores the transmission rate and the switching signal notifying the line switching caused by the fault in the dual port memory 648 in such a manner that the transmission rate and the switching signal can be read out by the SCUs 652, 654 and 656. The main control unit 650 outputs a switching control signal such that the data signal (electric signal) transmitted from each of optical receivers 624, 626, 630, 632, 636 and 638 can be inputted into corresponding optical receivers.

The cross-connect switch 646 switches the data signal (electric signal) inputted from each of optical receivers 624, 626, 630, 632, 636 and 638 based on the switching control signal of the main control unit 650. The switching operation is carried out such that the data signal (electric signal) can be transmitted to nodes requiring the data signal.

The SCUs 652, 654 and 656 access the dual port memory 648 and send control information (electric signal) obtained from the dual port memory 648 to the corresponding optical transmitters 658, 664 and 670. The optical transmitters 658, 664 and 670 convert control information (electric signal), that is provided from corresponding SCUs 652, 654 and 656, into the optical signal and output the optical signal. At this time, as mentioned above, control information includes the switching signal and the transmission rate. Other optical transmitters 660, 662, 666, 668, 672 and 674 perform the stabilizing process for the transmission of the signal according to the setting signal of the main control unit 650. When the stabilizing process has been completed, the optical transmitters 660, 662, 666, 668, 672 and 674 convert the data signal (electric signal); which is transmitted from the cross-connect switch 646, into the optical signal having a predetermined transmission speed and output the optical signal. Accordingly, the stabilizing process can be simultaneously carried out in the optical receivers 624, 626, 630, 632, 636 and 638 and in the optical transmitters 660, 662, 666, 668, 672 and 674. The reason for this is that the stabilizing process is not performed by using the inputted signal, but is performed by using the setting signal provided from the main control unit 650.

The converted optical signal outputted from the optical transmitters 660 and 662 is multiplexed by means of a multiplexer 676. In addition, the multiplexing optical signal is transmitted into the node A 105 while being multiplexed with the optical signal of the optical transmitter 658 by means of a multiplexer 682. The converted optical signal outputted from the optical transmitters 666 and 668 is multiplexed by means of a multiplexer 678. In addition, the multiplexing optical signal is transmitted into the node C while being multiplexed with the optical signal of the optical transmitter 664 by means of a multiplexer 684. The converted optical signal outputted from the optical transmitters 672 and 674 is multiplexed by means of a multiplexer 680. In addition, the multiplexing optical signal is transmitted into the node D 103 while being multiplexed with the optical signal of the optical transmitter 670 by means of a multiplexer 686.

As mentioned above, according to the OXC of the present invention, the total turnaround time required for receiving and outputting the optical signal is determined by either the turnaround time at the optical receiver, or the turnaround time at the optical transmitter. For example, if the turnaround time at the optical receiver is longer than the turnaround time at the optical transmitter, the turnaround time at the optical receiver is the total turnaround time. By contrast, if the turnaround time at the optical transmitter is longer than the turnaround time at the optical receiver, the turnaround time at the optical transmitter is the total turnaround time. Therefore, as compared with the conventional art, where the total turnaround time is determined by adding the turnaround time at the optical transmitter to the turnaround time at the optical receiver, the total turnaround time of the present invention, which is determined by either the turnaround time at the optical transmitter or the turnaround time at the optical receiver of the OXC, is shortened. The above result means that the time delay caused by the automatic transmission speed conversion is reduced.

Figure 4:
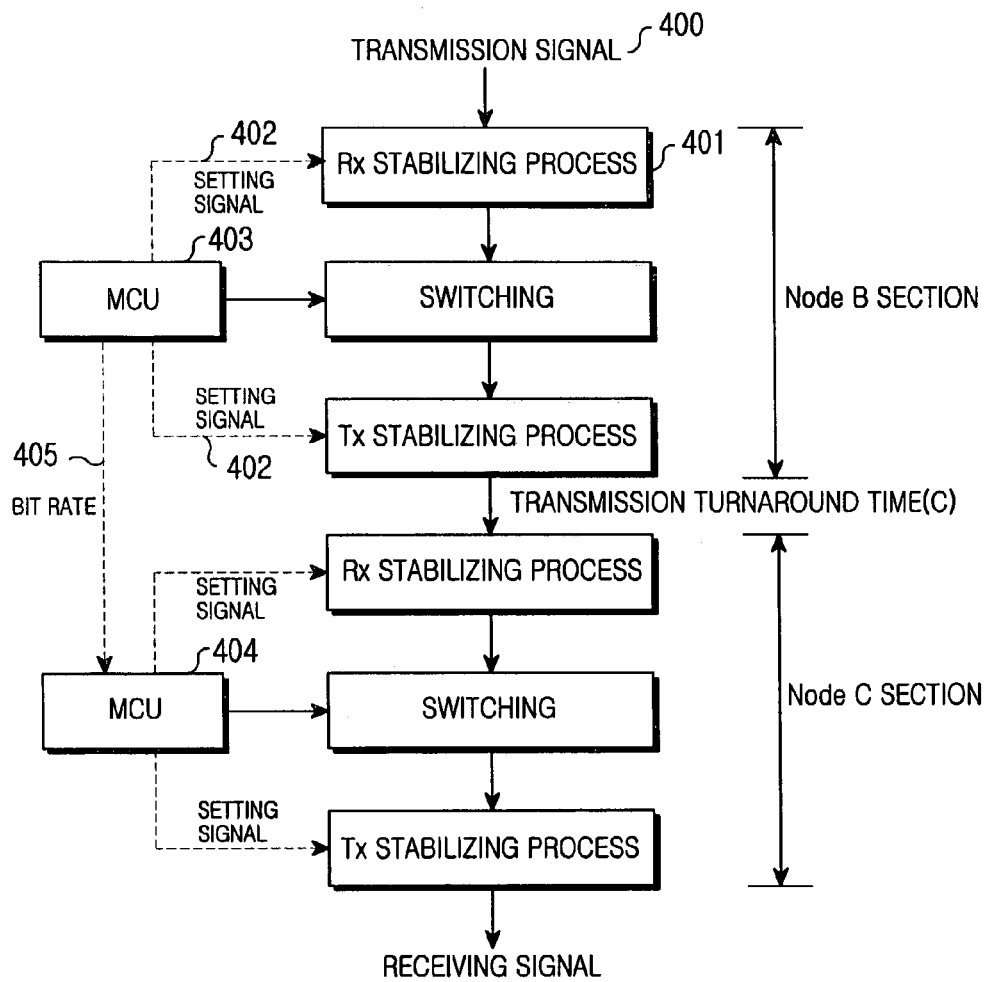
FIG. 4 illustrates a processing flow diagram for an OXC according to one embodiment of the present invention.

FIG. 4 is a flow diagram illustrating a signal processing flow, in a normal state, of an optical network equipped with the OXC according to the present invention.

Referring to FIG. 4, if the optical signal 400 to be transmitted is received in the optical receiver of the node B 100, the optical receiver performs the stabilizing (Rx stabilizing) process 401 based on the setting signal 402 provided from the MCU 403 of the node B 100. At the same time, the setting signal of the MCU 403 is transmitted into the optical transmitter so that the optical transmitter performs the stabilizing process based on the setting signal for converting the electric signal into the optical signal. Therefore, the optical signal to be transmitted is converted into the electric signal with a predetermined time delay corresponding to the Rx stabilizing process 401. The electric signal in inputted into the switch and switched under the control of the MCU 403. The electric signal inputted into the predetermined optical transmitter through the switch is converted into the optical signal by means of the optical transmitter without the time delay, so that the optical signal is transmitted into the node C 101. The setting signal, that is the transmission rate, provided for the stabilizing process of the optical receiver and the optical transmitter, is transmitted into the MCU 404 of the node C 101 by means of the MCU 403 of the node B 100. The MCU 404 of the node C 101 receives the transmission rate 405 in order to perform the stabilizing process for the optical receiver and the optical transmitter.

Referring again to FIG. 6, the MCU 403 of the node B 100 records the transmission rate in the dual port memory 648. Then, the corresponding SCU reads out the transmission rate recorded in the dual port memory 648 and transmits the transmission rate, as an optical signal, through the optical transmitter. The transmitted optical signal is received in the predetermined optical receiver of the node C 101. Then, the optical signal is converted into the electric signal by means of the optical receiver and is transmitted into the corresponding SCU. The SCU of the node C 101 records the electric signal in the dual port memory and the MCU 404 of the node C 101 reads out transmission information recorded in the dual port memory 648 so as to perform the stabilizing process of the optical transmitter and the optical receiver. That is, the MCU 404 of the node C 101 provides the transmission rate obtained from the dual port memory 648 as a setting signal of the optical receiver and the optical transmitter, so that the stabilizing process for the optical receiver and the optical transmitter can be carried out.

Accordingly, when the optical signal is received from the optical transmitter of the node B 100, the optical receivers of the node C 101 do not perform the separate stabilizing process for the automatic transmission speed conversion. The reason for this is that the stabilizing process has already been performed in the optical receivers of the node C 101 by means of the transmission rate 405 provided from the node B 100, so the optical receivers of the node C 101 are ready for processing the optical signal.

According to this embodiment of the present invention, the total turnaround time required for transmitting the optical signal from the transmission node to the receiving node is defined as the sum of the turnaround time required for performing the stabilizing process at the node and the turnaround time required for transmitting the optical signal between the nodes. Therefore, as compared with the total turnaround time of the conventional art, where the total turnaround time is defined as the sum of the turnaround time required for performing the stabilizing process at each node due to the automatic transmission speed conversion and the turnaround time required for transmitting the optical signal between the nodes, the total turnaround time according to the present invention is reduced.

Figure 1:
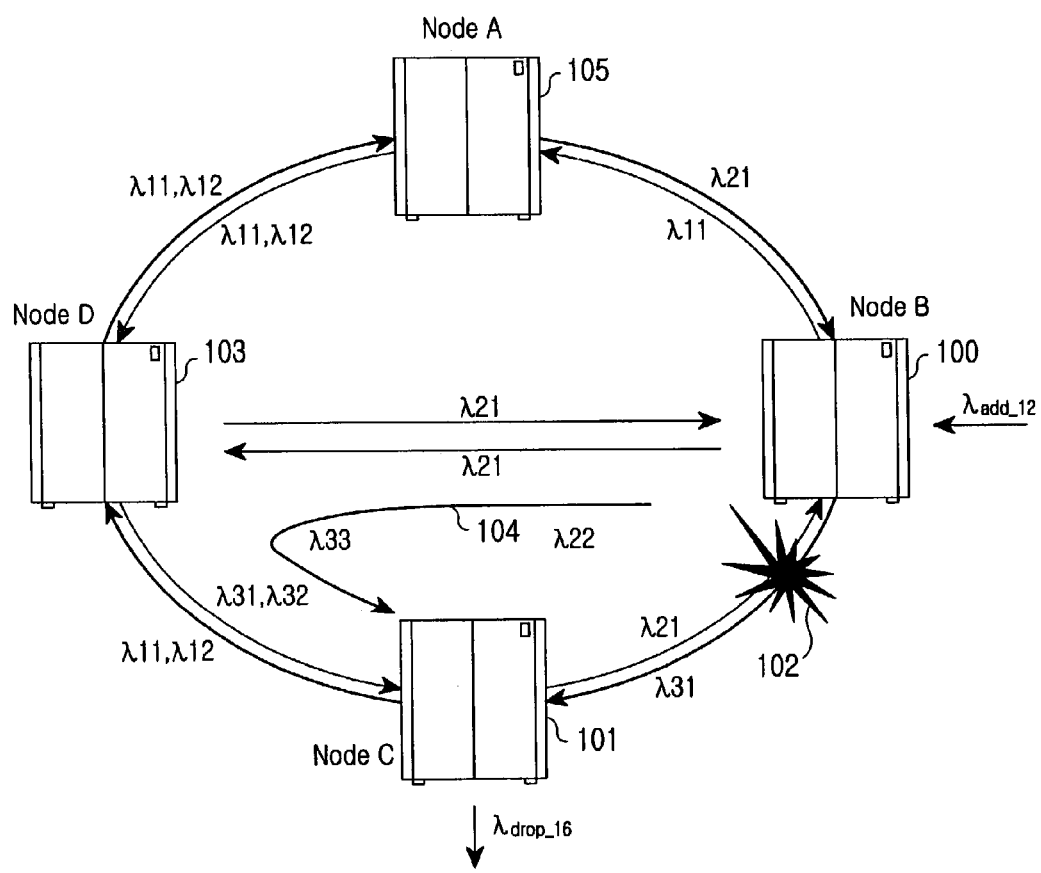
FIG. 1 illustrates a line switching caused by a fault in a conventional optical network.
Figure 2:
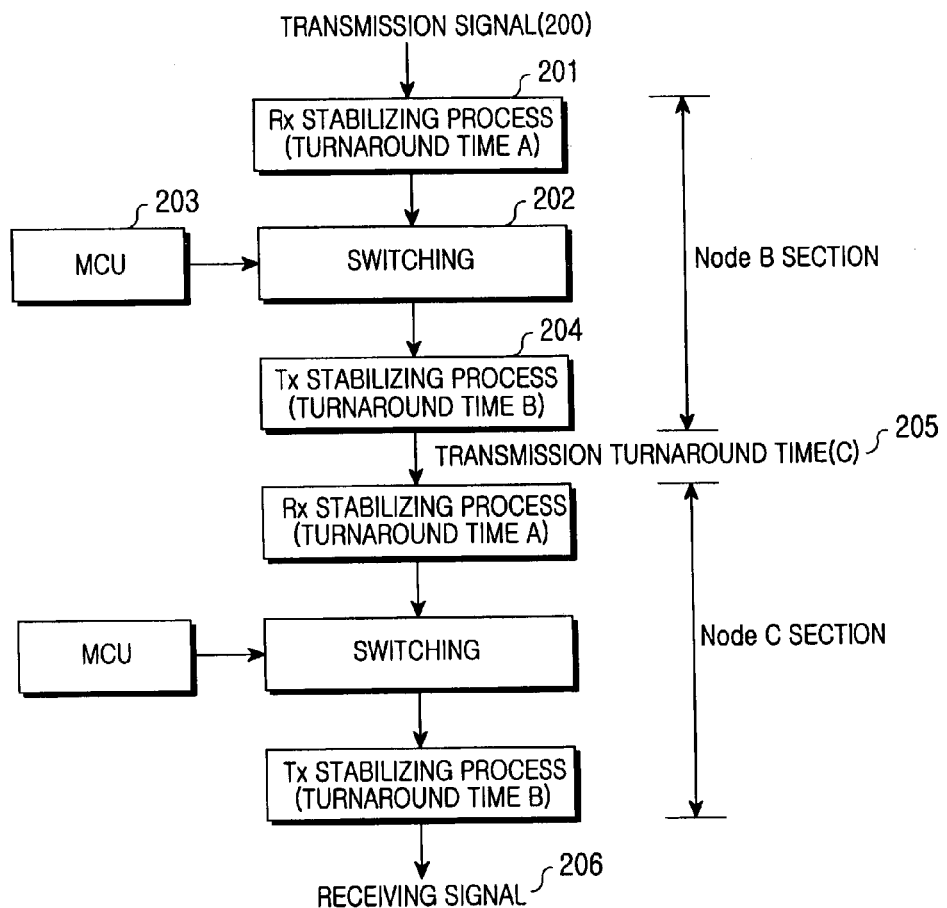
FIG. 2 illustrates a processing flow diagram, in a normal state, of a conventional optical network.
Figure 3:
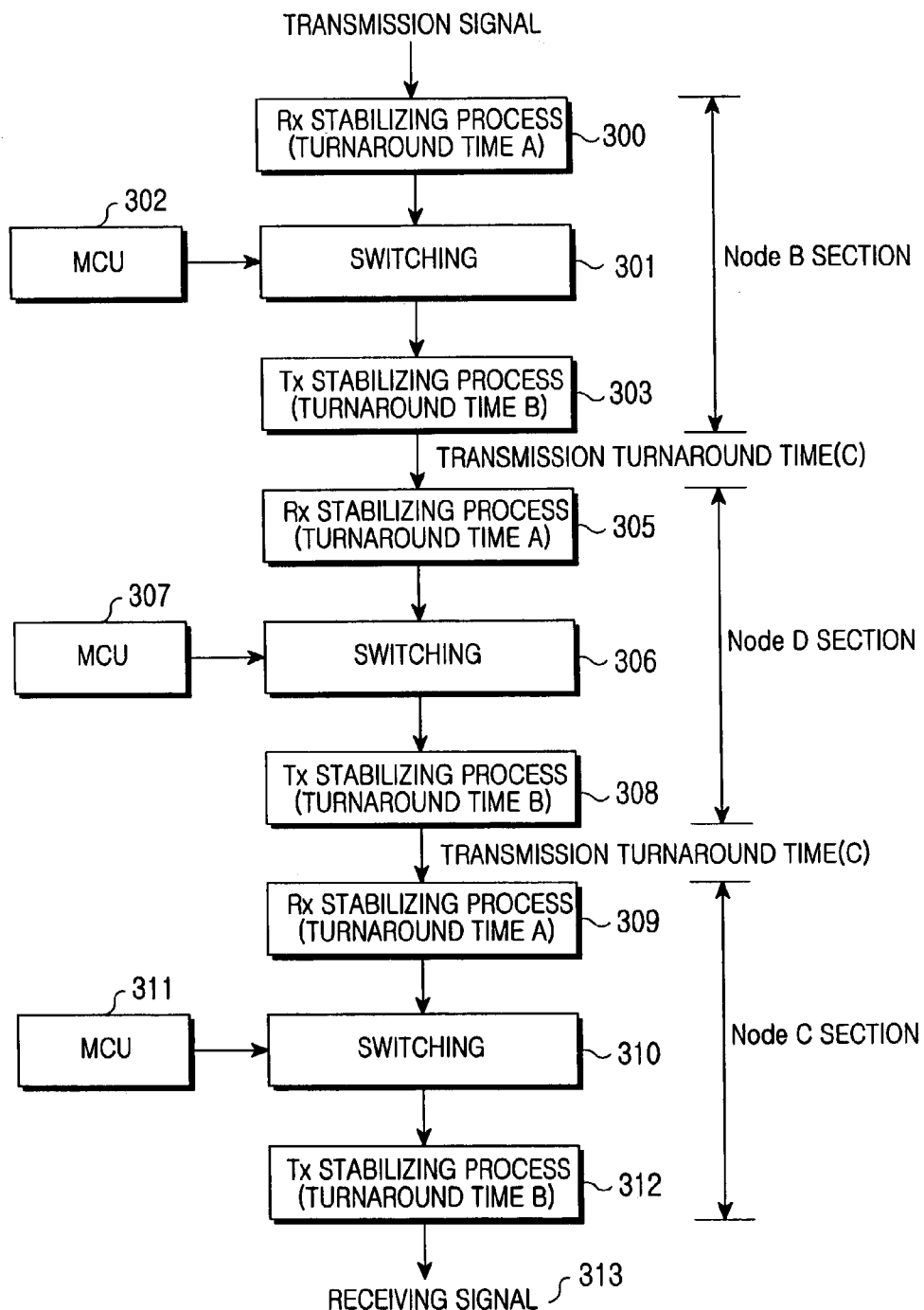
FIG. 3 illustrates a processing flow diagram, in an abnormal state, of a conventional optical network.
Figure 5:
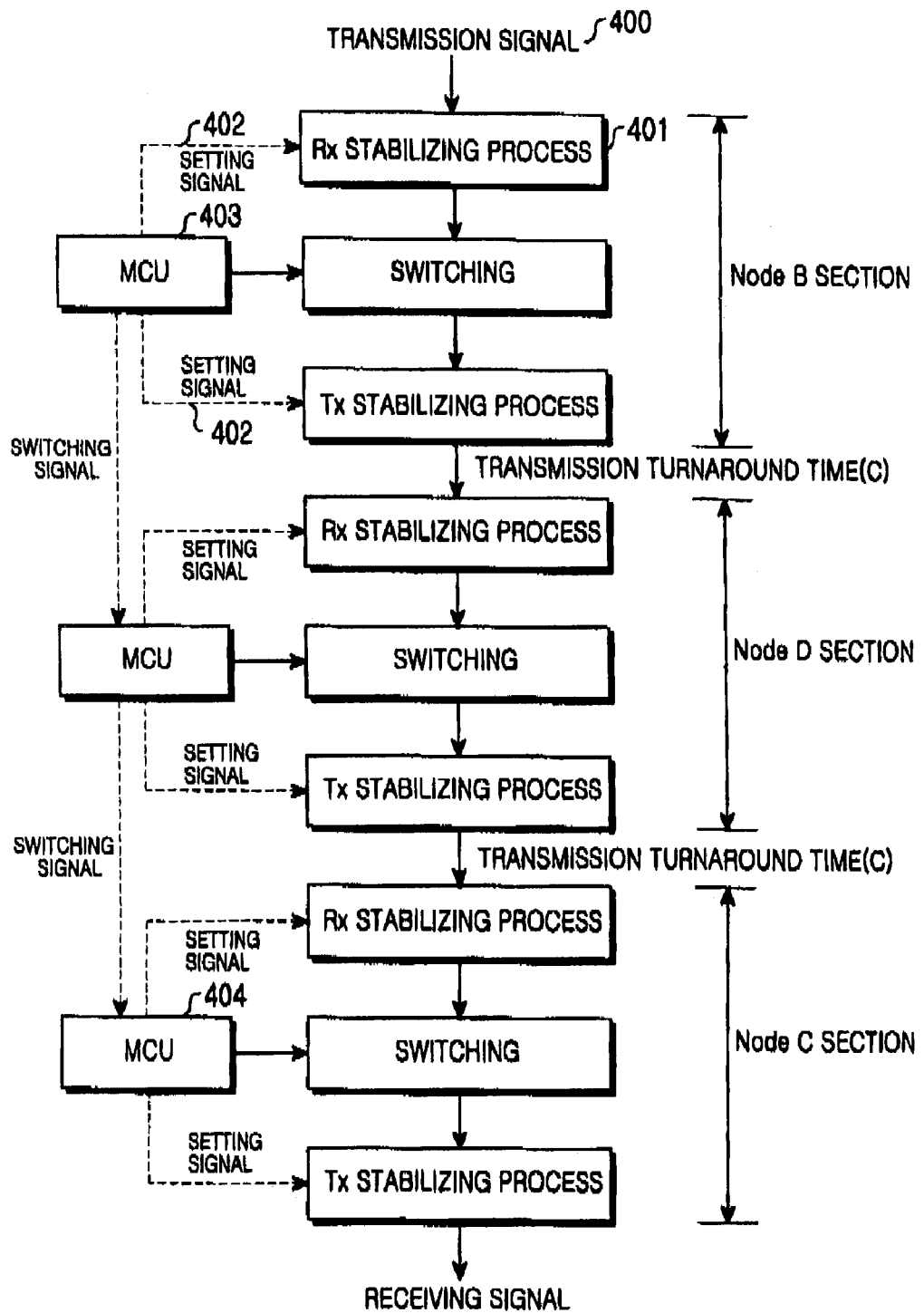
FIG. 5 illustrates a processing flow diagram of a normal state, for an optical network according to one embodiment of the present invention.

FIG. 5 illustrates a signal processing flow when a line switching occurs due to the fault in the optical network equipped with the OXC according to one embodiment of the present invention. FIG. 5 illustrates a fault occurring between the node B 100 and the node C 101, as illustrated in FIG. 1.

Referring to FIG. 5, if the node B 101 detects the fault in the line while transmitting the optical signal according to the procedure shown in FIG. 4, the line switching is carried though a detour route. A route connected to the node C 101 via the node D 103 is used as the detour route. Thus, the MCU 403 of the node B 100 records the switched signal noting the line switching in the dual port memory 648 and each SCU reads out the switching signal recorded in the dual port memory 648 so as to transmit the switching signal to adjacent nodes through corresponding optical transmitters. Upon receiving the optical signal, the optical receiver of the node B 100 performs the stabilizing (Rx stabilizing) process 401 based on the setting signal of the MCU 403. At the same time, the setting signal 402 of the MCU 403 is also transmitted into the optical transmitter so that the optical transmitter performs the stabilizing process for converting the electric signal to the optical signal.

The switching signal transmitted from the node B 100 is introduced to the SCU through the optical receiver and the SCU stores the switching signal in the dual port memory 648 in order to allow the MCU 403 to read out the switching signal. In addition, the transmission rate 405, which has transmitted from the node B 100 before the fault occurred, is stored in the dual port memory 648. Therefore, the MCU 403 provides the transmission rate 405 stored in the dual port memory 648 to the optical receiver and the optical transmitter as a setting signal 402 when the switching signal is read out from the dual port memory 648. The optical receiver and the optical transmitter perform the stabilizing process based on the transmission rate 405 provided from the MCU 403. The SCU provided in the node D 103 reads out the switching signal stored in the dual port memory 648 and provides the switching signal to the node C 101 through the predetermined optical transmitter.

The node C 101 receives the switching signal through the optical receiver and the received switching signal is stored in the dual port memory 648 by means of the SCU. The MCU 404, which receives the switching signal through the dual port memory 648, reads out the transmission rate 405 recorded in the dual port memory 648 and provides the transmission rate 405 to the optical receiver and the optical transmitter as a setting signal 402. Thus, the optical receiver and the optical transmitter perform the stabilizing process based on the setting signal 402, that is, based on the transmission rate 405.

As mentioned above, if the fault occurs in the line, the transmission OXC (node B 100) transmits the switching signal into the peripheral OXCs, so that the OXCs can perform the stabilizing process based on the transmission rate 405 so as to switch into a new line. The optical receiver and the optical transmitter of the OXCs to be switched into the new line are set to the required transmission speed, so the optical signal can be transmitted without the time delay. According to the present invention, when the line switching occurs due to the fault in the line, the total turnaround time is defined as the sum of the turnaround time for performing the stabilizing process and the transmission time delay between the nodes. For example, the total turnaround time is defined as "turnaround time A+transmission delay time C×2". Therefore, as compared with the total turnaround time of the conventional art, where the total turnaround time is defined as the sum of the turnaround time required for performing the stabilizing process at each node due to the automatic transmission speed conversion and the turnaround time required for transmitting the optical signal between the nodes, the total turnaround time is reduced according to the present invention.

As described above, according to the present invention, the stabilizing process can be simultaneously performed at each node when the signal is transmitted to the receiving node from the transmission node, so the total turnaround time can be reduced. In addition, when the line switching is required due to the fault of the line, the stabilizing process can be simultaneously performed at the nodes passing though the new lines as well as the transmission and receiving nodes, so the total turnaround time required for transmitting and receiving the signal is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A stabilizing method for a signal transmission from a transmission optical cross-connect (OXC) to a receiving OXC in an optical network, in which a plurality of OXCs each having a plurality of optical receivers and optical transmitters are connected to each other through optical lines, the method comprising the steps of:
   determining by an OXC of a transmission rate that corresponds to a transmission speed of an inputted signal;
   stabilizing a predetermined optical receiver, that converts the inputted signal into an electric signal and a predetermined optical transmitter that converts the electric signal into an optical signal, through use of the determined transmission rate;
   transmitting the determined transmission rate into an adjacent OXC by the transmission OXC, wherein an adjacent OXC is one of said plurality of OXCs that is directly connected to another of said plurality of OXCs through an optical line;
   receiving the transmission rate provided from the transmission OXC by the receiving OXC and a relay OXC aligned in a route, through which the signal is transmitted to the receiving OXC from the transmitting OXC; and
   determining the received transmission rate as a transmission rate for stabilizing the predetermined optical receiver and the predetermined optical transmitter by the receiving OXC and the relay OXC aligned in the route.

2. The method of claim 1, further comprising the steps of:
   when a fault occurs in a route, through which the signal is transmitted to the receiving OXC from the transmission OXC, transmitting by the transmission OXC of a switching signal to the adjacent OXCs in order to perform a line switch; and,
   in response to the transmitted switching signal, the OXCs aligned in the new route performing a stabilizing process for the predetermined optical receiver and the predetermined optical transmitter through the use of the transmission rate transmitted by the transmission OXC.

3. An optical network that transmits a signal from a transmission section to a receiving section and having a plurality of OXCs which are connected to each other through optical lines, the optical network comprising:
   a transmission OXC that transmits to adjacent OXCs a transmission rate determined from the transmission rate corresponding to a transmission speed of an inputted optical signal, and performs a stabilizing process to convert the inputted optical signal into an electric signal and converts the electric signal into an optical signal through the use of the determined transmission rate,
   wherein an adjacent OXC is one of said plurality of OXCs that is directly connected to another of said plurality of OXCs through an optical line;
   a receiving OXC that receives the transmission rate transmitted from the transmission OXC and performs the stabilizing process corresponding to the inputted optical signal and an outputted optical signal through the use of the received transmission rate; and
   a relay OXC aligned in a route through which the outputted optical signal is transmitted to the receiving OXC from the transmission OXC.

4. An optical network as claimed in claim 3, wherein the transmission OXC comprises:
   a main control unit that determines the transmission rate corresponding to the transmission speed of the inputted optical signal;
   a plurality of optical receivers that each output an electric signal as a conversion of the inputted optical signal into the electric signal after performance of the stabilizing process using the transmission rate determined by the main control unit;
   a cross-connect switch that switches the electric signal of the plurality of optical receivers under a control of the main control unit;
   a plurality of first optical transmitters that perform the stabilizing process simultaneously with the plurality of optical receivers through use of the transmission rate determined by the main control unit and convert the electric signal switched by cross-connect switch into the optical signal;
   a dual port memory for storing the transmission rate determined by the main control unit;
   a plurality of supervisor channel units for reading out the transmission rate stored in the dual port memory and outputting the transmission rate;
   a plurality of second optical transmitters for converting the transmission rate provided from the plurality of supervisor channel units into the optical signal; and
   a multiplexer for multiplexing optical signals of the first and second optical transmitters in order to transmit multiplexed optical signals to one of the relay OXC and the transmission OXC.

5. An optical network as claimed in claim 3, wherein the relay OXC and the receiving OXC comprises:
   a plurality of optical receivers that perform the stabilizing process through use of a predetermined transmission rate and convert the inputted optical signal into the electric signal;
   a plurality of first supervisor channel units that receive and store the electric signal in a dual port memory, said electric signal being converted by some of the plurality of optical receivers;
   a main control unit to read out the transmission rate from the dual port memory and output the transmission rate into the plurality of optical receivers and a first and second plurality of optical transmitters;
   a cross-connect switch that switches the electric signal of the optical receivers under a control of the main control unit;
   a plurality of first optical transmitters that perform the stabilizing process simultaneously with the optical receivers through use of the transmission rate provided from the main control unit and convert the electric signal switched by the cross-connect switch into the optical signal;

a plurality of second supervisor channel units to read out the transmission rate stored in the dual port memory and output the transmission rate;

a plurality of second optical transmitters that convert the transmission rate stored in the dual port memory by the plurality of second supervisor channel units into the optical signal; and a multiplexer to multiplex optical signals of the first and second optical transmitters and output the multiplexed optical signal.

6. A method for performing a line switching when a fault occurs in a line while transmitting a signal from a transmission OXC to a receiving OXC through an optical line in an optical network, in which a plurality of OXCs having a plurality of optical receivers and optical transmitters are connected to each other through a plurality of optical lines, the method comprising the steps of:

transmitting a transmission rate to adjacent OXCs by using the transmission OXC, while determining the transmission rate corresponding to a transmission speed of an inputted signal;

when the fault requires line switching, transmitting a switching signal to adjacent OXCs by using the transmission OXC, wherein an adjacent OXC is one of said plurality of OXCs that is directly connected to another of said plurality of OXCs through an optical line; and in response to the switching signal caused by the line switching, performing a stabilizing process for a predetermined optical receiver and a predetermined optical transmitter through use of the transmitted transmission rate, at least one of said plurality of OXCs, and the transmission OXC which are aligned in a route corresponding to a new line.

* * * * *